United States Patent
Rodriquez (12) 
(10) Patent No.: US 6,263,346 B1
(45) Date of Patent: Jul. 17, 2001

(54) NETWORK WITH STORAGE OF ALL CLIENT COMPUTER PROGRAMS IN SERVER COMPUTER HAVING CUSTOMIZED CLIENT GRAPHICAL USER INTERFACES WITH MAXIMUM SHARING OF STORED PORTIONS OF INTERFACES COMMON TO A PLURALITY OF CLIENTS

(75) Inventor: Ingrid Milagros Rodriquez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/118,560

(22) Filed: Jul. 17, 1998

(51) Int. Cl.[7] .................................................. G06F 17/30
(52) U.S. Cl. .......................... 707/201; 345/334; 709/220
(58) Field of Search ..................................... 345/329, 326, 345/333, 334; 709/203, 217, 218, 219, 220; 707/10, 203, 201

(56) References Cited

U.S. PATENT DOCUMENTS

| | | | |
|---|---|---|---|
| 5,179,700 | * 1/1993 | Aihara et al. | 345/326 |
| 5,675,520 | * 10/1997 | Pitt, III et al. | 703/23 |
| 5,818,446 | * 10/1998 | Bertram et al. | 345/334 |
| 5,831,608 | * 11/1998 | Janay et al. | 345/334 |
| 5,897,635 | * 4/1999 | Torres et al. | 707/10 |
| 5,973,686 | * 10/1999 | Shimogori | 345/333 |
| 6,023,780 | * 2/2000 | Mendez et al. | 707/203 |
| 6,151,606 | * 11/2000 | Mendez | 707/201 |

* cited by examiner

Primary Examiner—Kenneth R. Coulter
(74) Attorney, Agent, or Firm—J. B. Kraft; Leslie A. Van Leeuwen; Richard A. Henkler (57) ABSTRACT

A network for small businesses is provided which is easy to install, configure and operate and still provides users of the client computers in the network with the same degree of flexibility in configuring graphical user interfaces to operating systems and application programs as do present stand alone personal computers. All of the software to be used by the client computers: operating systems and application programs is stored on the network server computer. The graphical user interfaces to the operating systems and application programs are customized in the conventional manner by the users of the client computers, usually at the client computer through a conventional interactive display. In the customization of a program, the data representative of an initial user interface is stored. The system provides means for determining the differences between said subsequent user customized interface and said initial user interface, means for storing data representative of the differences of said subsequent interface from said initial interface and means for displaying said subsequent user interface by modifying the data representative of said initial interface with the data representative of said differences.

33 Claims, 8 Drawing Sheets

NETWORK WITH STORAGE OF ALL CLIENT COMPUTER PROGRAMS IN SERVER COMPUTER HAVING CUSTOMIZED CLIENT GRAPHICAL USER INTERFACES WITH MAXIMUM SHARING OF STORED PORTIONS OF INTERFACES COMMON TO A PLURALITY OF CLIENTS

CROSS-REFERENCE TO RELATED APPLICATIONS

The present patent application is related to Ser. No. 09/118,210, entitled "CONFIGURING COMPUTER NETWORK OPERATIONS BASED UPON A SEQUENCE OF INTERACTIVE USER ENTRIES INTO A NETWORK SERVER COMPUTER WITH A ONE TIME ENTRY OF DATA COMMONLY REQUIRED BY MULTIPLE CLIENTS", now allowed, which is hereby incorporated by reference herein.

In addition, the following applications are also related to the present invention:

The present patent application is related to Ser. No. 09/118,209, entitled "METHOD AND APPARATUS FOR ALLOWING A USER TO ROVE AMONG VARIOUS CLIENTS IN A NETWORK WHILE MAINTAINING INDIVIDUAL HARDWARE AND SOFTWARE PREFERENCES", now abandoned.

The present patent application is related to Ser. No. 09/118,211, entitled "SIMPLIFIED SETTING UP OF A NETWORK OF A SERVER COMPUTER PRELOADED WITH ALL COMPUTER PROGRAMS REQUIRED BY A GROUP OF CLIENT COMPUTERS TO BE CONNECTED INTO NETWORK", now U.S. Pat. No. 6,199,108.

The present patent application is related to Ser. No. 09/118,559, entitled "SYSTEM AND METHOD FOR CREATION OF A NETWORK COMPUTING ENVIRONMENT", still pending.

The present patent application is related to Ser. No. 09/118,208, entitled "CONFIGURING COMPUTER NETWORK OPERATIONS BASED UPON THE CORRELATION OF A SEQUENCE OF INTERACTIVE DISPLAY USER ENTRIES APPARENTLY UNRELATED TO COMPUTER OPERATIONS", now allowed.

The present patent application is related to Ser. No. 09/118,557, entitled "DATA PROCESSING SYSTEM, METHOD, AND PROGRAM PRODUCT FOR AUTOMATING ACCOUNT CREATION IN A NETWORK", now U.S. Pat. No. 6,182,131.

The present patent application is related to Ser. No. 09/118,293, entitled "COMPUTER SOFTWARE SYSTEM FOR ELIMINATING OPERATING SYSTEM MULTIPLE LOGINS UNDER REMOTE PROGRAM LOAD WITH NETWORK PROVIDER DYNAMIC LINK LIBRARY", still pending.

The present patent application is related to Ser. No. 09/118,292, entitled "SERVER AND COMPUTER NETWORK THAT PERMIT A CLIENT TO BE EASILY INTRODUCED INTO THE COMPUTER NETWORK", now U.S. Pat. No. 6,108,779.

The present patent application is related to Ser. No. 09/118,207, entitled "METHOD AND APPARATUS FOR CREATING A PRELOAD IMAGE", still pending.

The present patent application is related to Ser. No. 09/118,558, entitled "METHOD AND APPARATUS FOR ALLOWING A USER TO ROVE AMONG VARIOUS CLIENTS IN A NETWORK WHILE MAINTAINING INDIVIDUAL HARDWARE PREFERENCES", now abandoned.

The present patent application is related to Ser. No. 09/118,555, entitled "AUTOMATIC CLEANUP OF USER DATA IN A NETWORK ENVIRONMENT", still pending.

The present patent application is related to Ser. No. 09/118,556, entitled "METHOD AND APPARATUS FOR DETECTING AND INITIALIZING THE ADDITION OF A NEW CLIENT MACHINE IN A NETWORK", now U.S. Pat. No. 6,105,100.

TECHNICAL FIELD

The present invention relates to the configuration of networks, and particularly to local area networks of a primary server computer controlling a plurality of client computers applicable to small businesses, which are particularly simple to configure and use.

BACKGROUND OF THE INVENTION

Computers and their application programs are used in all aspects of business, industry and academic endeavors. In recent years, there has been a technological revolution driven by the convergence of the data processing industry with the consumer electronics industry. This advance has been even further accelerated by the extensive consumer and business involvement in the Internet. As a result of these changes, it seems as if virtually all aspects of human productivity in the industrialized world requires human/computer interaction. The computer industry has been a force for bringing about great increases in business and industrial productivity. Almost every week seems to bring computer industry advances which promise even further increases in productivity. These advances offer to drive down business and industry costs and increase efficiency in addition to increasing productivity. In addition, the cost of "computer power" continues to drop as a result of rapid advances in computer related technologies.

Despite all of these advantages, there still remains great resistance in all industries and business fields to new computer systems and significant system upgrades which offer much in productivity increases. This resistance results from past experience which equates installing new computer systems or significant upgrades in existing systems with large amounts of down time, during which the business, manufacturing facility or individual worker functions are inoperative or operate at diminished levels. When a business or production facility is trying to decide whether to install a new computer system the concern about down time, the possible loss of business, as well as stress on the workers involved, very often outweighs the cost of the installation in influencing the decision. The concern about business and production delays resulting from installation has become so great that fewer and fewer small businesses are trying to make system and program changes on their own. This concern is even greater when the business is considering the installation of a computer network. While many businesses would most likely be much more productive if their computers were interconnected with each other, the thought of a network may be very frightening to many small businesses without too much computer experience. They are likely to consider the concepts to be learned and the technology required to connect two or more computers in a network as too complex, time consuming or error prone to be attempted by the average small business user or owner.

There is a substantial challenge in the installation of computer network systems for small businesses. In this marketplace we are dealing with a group whose available time is being stressed to its limits by the pressures of current economic systems. Even though the network computer systems procurable by these business people may offer eventual salvation to their other business stresses, the prospect of a new computer installation is often quite ominous to them.

The above-referenced copending applications: "Configuring Computer Network Operations Based Upon the Correlation of a Sequence of Interactive Display User Entries Apparently Unrelated to Computer Operations", Casey, Dean and Rodriguez and "Simplified Setting Up of a Network of a Server Computer Preloaded With All Computer Programs Required by a Group of Client Computers to be Connected Into Network", Casey, Dean and Rodriguez, provide computer networks which are very easy to install, operate and upgrade. The networks have a primary server computer on which substantially all software, including operating systems to be used by client computers in the network, is loaded into and maintained in the server computer storage. This software is then allocated to the client computers according to user needs and distributed to the client computers when called for by particular users and then returned to the server computer where the software is stored. The client computers in the networks have minimal storage capacity as little is stored at the client computers. In fact, the client computers do not need their own hard disk drives. Using conventional storage expedients, such networking systems would be expected to offer little flexibility to the users of the client computers in the configuring of their own individualized graphical user interfaces (GUIs) to the operating systems and to the application programs being provided to them from the server computer. Considering the substantial quantities of storage capacity required by the graphical image data in the screen panels in such interfaces, they would be expected to consume substantial portions of storage capacity of the server computer which is primarily in its hard disk drive. This, in turn, could limit the number of client computers that a server could support and/or limit the number of application programs available for allocation to clients by the server computer. Thus, it might be expected that the trade off for an easy to install and configure local network would be very little flexibility in the individualizing of the GUIs. However, part of the ease of use of computer operations would be the ability of users to design individualized interfaces with which the users would feel comfortable. Thus, there is a need to provide users with the flexibility to tailor user interfaces despite the limited storage capacity in the server.

SUMMARY OF THE INVENTION

The present invention provides a solution to the above problems by providing a network for small businesses which is easy to install, configure and operate and still provides users of the client computers in the network with the same degree of flexibility in configuring graphic user interfaces to operating systems and application programs as do present stand alone personal computers. All of the software to be used by the client computers, operating systems and application programs, are stored on the network server computer. Thus, the key to the present invention is in the system for storing the data representative of the variety of graphic user interfaces customized by the users so that a minimum of the server's storage capacity is used.

The graphical user interfaces to the operating systems and application programs are customized in the conventional manner by the users of the client computers, usually at the client computer through a conventional interactive display. In the customization of a program, the data representative of an initial user interface is stored. This may be the default interface provided by the particular application program or operating system, or it may be an interface customized at the network level for a particular group or department of users. The initial interface may be one previously customized by the user who is now making changes in his GUIs. Now the system provides means for determining the differences between said subsequent user customized interface and said initial user interface, means for storing data representative of the differences of said subsequent interface from said initial interface and means for displaying said subsequent user interface by modifying the data representative of said initial interface with the data representative of said differences. This results in a significant savings of storage capacity since only the initial interfaces need to be fully stored; each customized interface requires only stored data representative of the changes from the initial interface.

The data representative of the initial interfaces and the changes as a result of customization are stored in the server computer, which also controls the combination of this data to provide the customized GUIs. The interfaces are correlated with the user IDs. Thus, there are means in the server computer for identifying customized GUIs with a specific user whereby said interface is presented to said user in response to a user logon to a client computer in said network. The customized interfaces could also be related to specific computers; thus, there could be means in the server computer for identifying the customized GUIs with a specific client computer whereby the interface is presented in response to a user logon to said client computer.

In accordance with an aspect of the present invention, data representative of the differences of the customized interface from the initial interface stores the data in the form of an image template to be superimposed upon initial GUIs to modify the images of said initial interface to display said subsequent customized user interface. This invention is applicable to conventional desktop environments provided by operating systems. Thus, the means for creating initial GUIs includes a graphical desktop environment and said subsequent graphical user interface includes a customized desktop environment.

DETAILED DESCRIPTION OF THE PREFERRED EMBODIMENT

Figure 1:
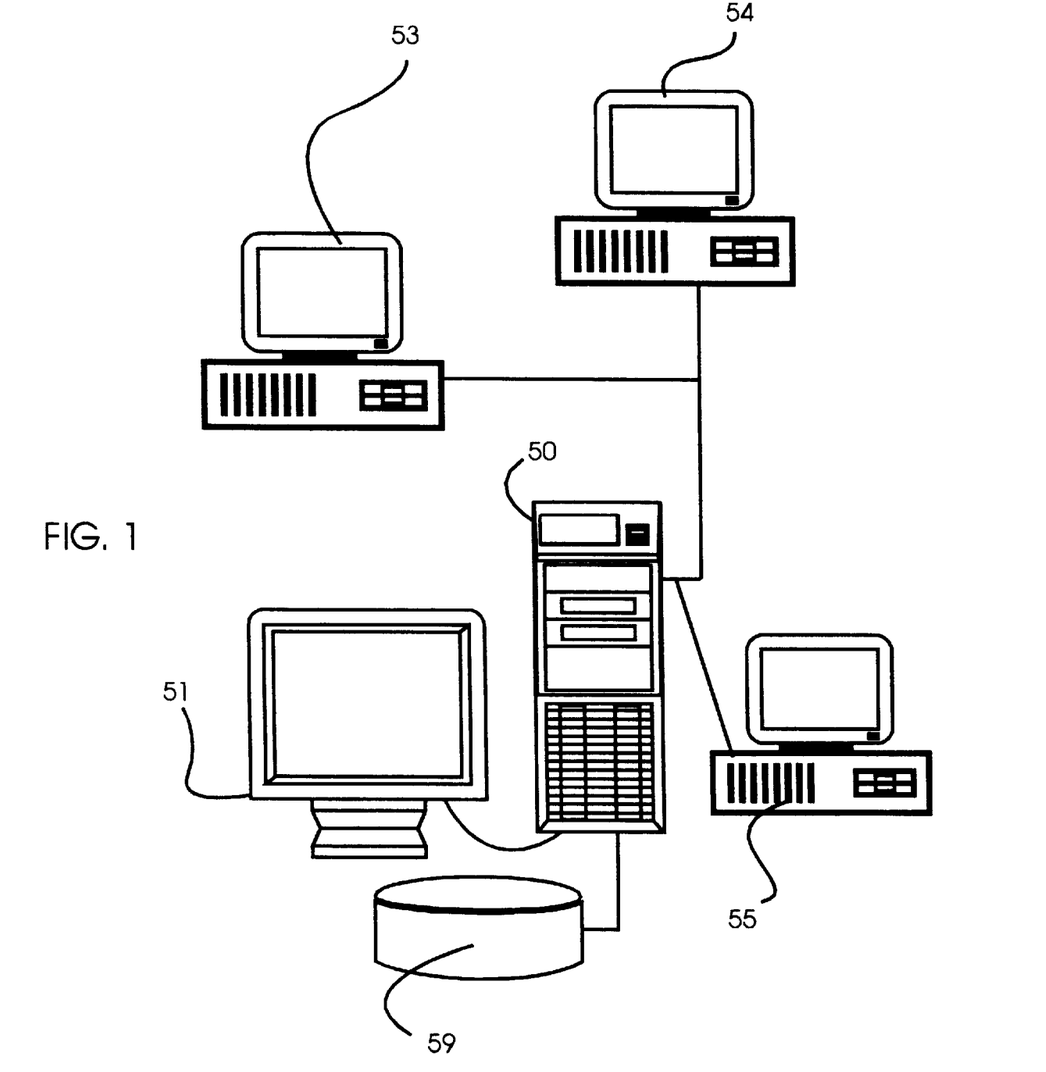
FIG. 1 is a generalized diagrammatic view of a network of server and client computers, the interfaces of which may be customized according to the present invention.

With reference to FIG. 1, there is shown a representative diagram of a local network which may be set up in accordance with present invention. The server computer 50 which has a plurality of client computers: clients 53, 54 and 55. As will be subsequently described, all customization configurations and settings by users are stored in server 50. Initial customizations and configurations which may apply to a network user in general may be made directly to server 50 through its display interface 51. All software, including operating systems and application programs for the network and for the client computers in the network, are also loaded into server 50 and stored in storage facility 59, which is a diagrammatic representation of the primary server storage capability, usually on an associated hard disk drive. As will be seen from the subsequent description, all of the programs to be used in the overall network are stored in association with server 50, e.g. in its storage facility 59, and then distributed as needed to the network users who will sign onto the client computers 53 through 55. The server 50 will allocate the appropriate programming applications to the signed on and identified users at the appropriate client computers. It is these users who will be customizing their GUIs in the subsequent descriptions. In the preferred operations, there will essentially be no operating systems or programs stored in the client computers other than just basic utilities needed to physically turn on and run the computers.

Figure 2:
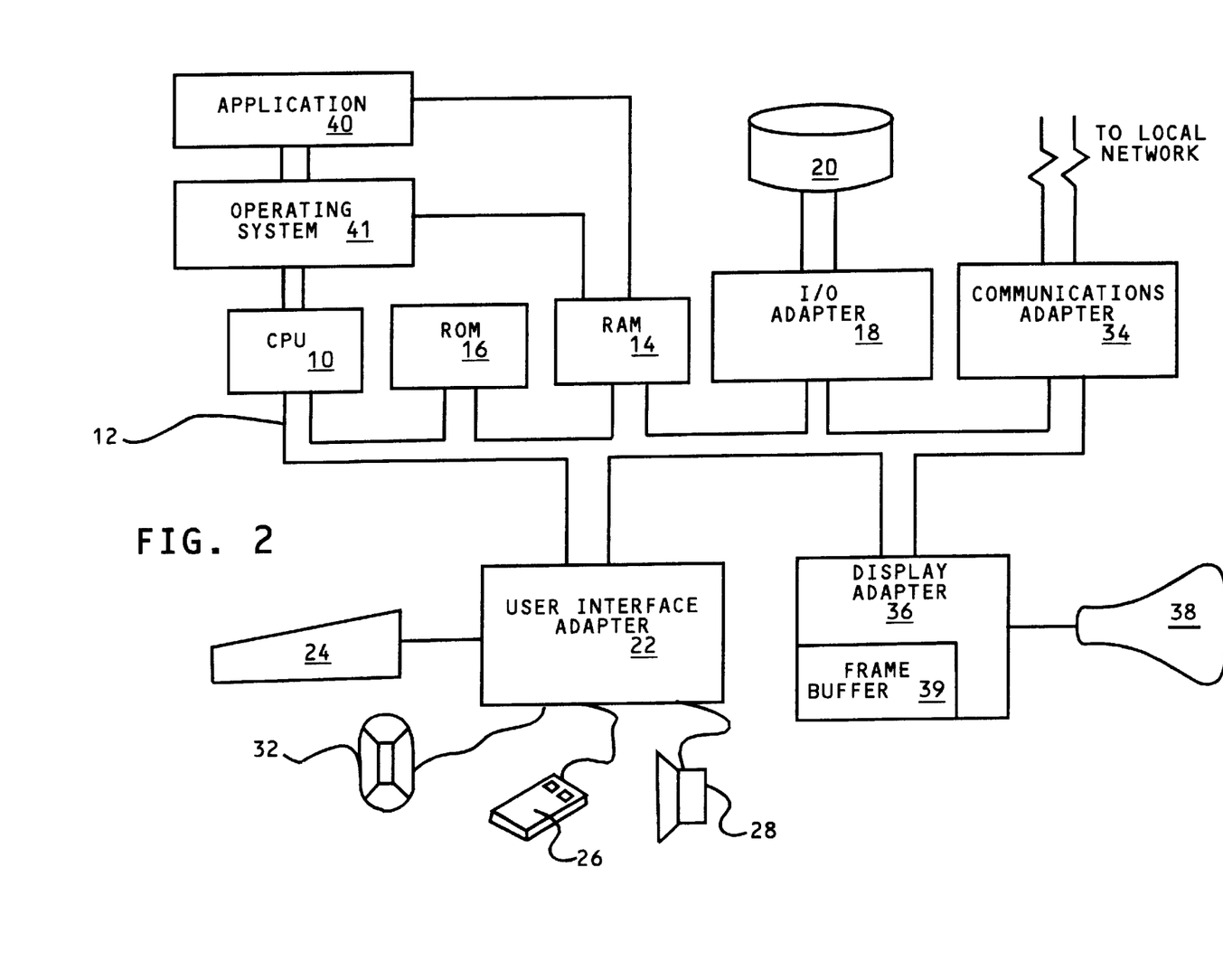
FIG. 2 is a block diagram of an interactive data processor controlled workstation display system including a central processing unit which is capable of serving as the server of this invention.

FIG. 2 is a diagram of a display interface workstation which can function as the primary server 50. A central processing unit (CPU), such as in one of the PC Server series of workstations available from International Business Machines Corporation, or the Poweredge 2200(™) Server ("Poweredge 2200" is a trademark of Dell Corporation) is provided and interconnected to various other components by system bus 12. An operating system 41 runs on CPU 10 and provides control and is used to coordinate the function of the various components of FIG. 2. Operating system 41 may be one of the commercially available network operating systems such as Windows NT(™) (Windows NT is a trademark of Microsoft Corporation), NetView(™) (NetView is a trademark of International Business Machines Corporation or NetWare(™) (NetWare is a trademark of Novell). UNIX or AIX network operating systems may also be used. The programming application for controlling all of the entries and consequent allocation of operating systems and application programs to client computers, as well as the customization, storage and subsequent display of GUIs to be subsequently described may be considered to be illustrated by application 40, which runs in conjunction with operating system 41 and provides output calls to the operating system 41, which implement the various functions to be performed by the application 40. A read only memory (ROM) 16 is connected to CPU 10 via bus 12 and includes the basic input/output system (BIOS) that controls the basic computer functions. Random access memory (RAM) 14, which will provide for a portion of the basic storage of entries to be subsequently described; I/O adapter 18 and communications adapter 34 are also interconnected to system bus 12. It should be noted that software components, including the operating system 41 and the application 40, are loaded into RAM 14 which is the computer system's main memory when the operating system and application programs are activated. I/O adapter 18 conventionally communicates with the disk storage device 20, i.e. a hard drive which will also be involved in the subsequently described storage. Communications adapter 34 interconnects bus 12 with the rest of the local network described in FIG. 1 enabling the data processing system to communicate with its client computers to control entry configurations and the allocation of programs to be subsequently described. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. The client computers, 53, 54 and 55 may be considered to have the same general structure described with respect to FIG. 2 except that they would not need a hard disk drive storage device 20.

It should be noted that the operating systems and all application programs to be allocated to the client computers will be stored in the server, mainly in disk storage 20, and when calls are made to distribute such programs to a particular client a copy of the program will be transmitted to the client through I/O adapter 18 to system bus 12 through communications adapter 34 through the local network connection. The operating system copy or application program copy to be used by the client will be received in the RAM of the client and then used by the client in a conventional manner as if the program came from the clients own disk storage. Also, the client computer may be any standard PC, such as those available from International Business Machines Corporation or Dell Corporation. The operating systems for the client PCs may be any standard PC operating system, such as OS/2(™) (OS/2 is a trademark of International Business Machines Corporation), Windows '95(™) (Windows '95 is a trademark of Microsoft Corporation), as well as UNIX or AIX PC operating systems.

There will now be described a simple illustration of the present invention with respect to the display screens of FIGS. 3 through 8. When the screen images are described, it will be understood that these may be rendered by storing an image and text creation programs, such as those in any conventional window operating system in the RAM 14 of the system of FIG. 2. The operating system is diagrammatically shown in FIG. 2 as operating system 41. Display screen images are presented to the viewer on display monitor 38 of FIG. 2. In accordance with conventional techniques, the user may control the screen interactively through a conventional I/O device, such as mouse 26 of FIG. 2, which operates through user interface 22 to call upon programs in RAM 14 cooperating with the operating system 41 to create the images in frame buffer 39 of display adapter 36 to control the display on monitor 38. As has been set forth hereinabove, all of the programs to be used by all of the users in the network of FIG. 1 are stored in server 50 and its associated storage facility 59. Now, with respect to FIGS. 3 through 8, we will describe how information is solicited from users on client computers so that the graphical user interfaces to the application programs and operating systems stored in the server computer may be customized by the users of the client computers in the network. The illustration will involve allocations within a small business network. Please note with respect to FIG. 1, the data entry panels shown in FIGS. 3 through 8 will be interactively shown to users on the displays of client computers 53, 54 or 55.

With respect to the illustrative display screen panels of FIGS. 3 through 6, we will give examples of how a user on a client computer may customize his GUIs to his operating system. While these example relate to operating systems, it should be understood that the same procedures would apply to the customization of interfaces to application programs. The present invention relates to how the customized aspects of the interfaces are stored and how the stored data representative of the customized interfaces is rendered to provide the customized interfaces to appropriate users.

Figure 3:
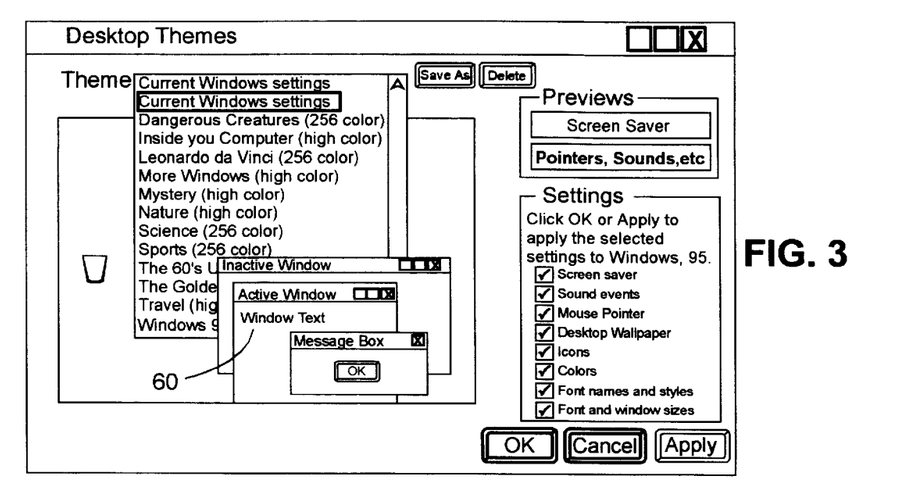
FIG. 3 is a diagrammatic view of an interactive dialog screen on one of the client computers prompting the user for customization of an operating system GUI at the desktop.
Figure 4:
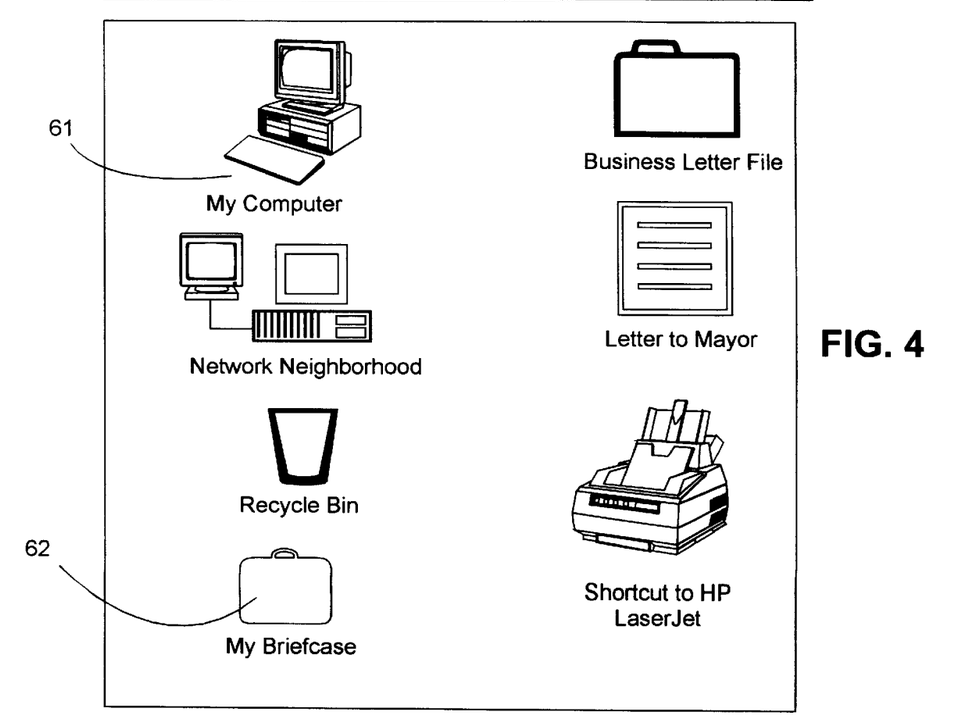
FIG. 4 is a section of a customized desktop interface as in FIG. 3 showing a particular icon arrangement.
Figure 5:
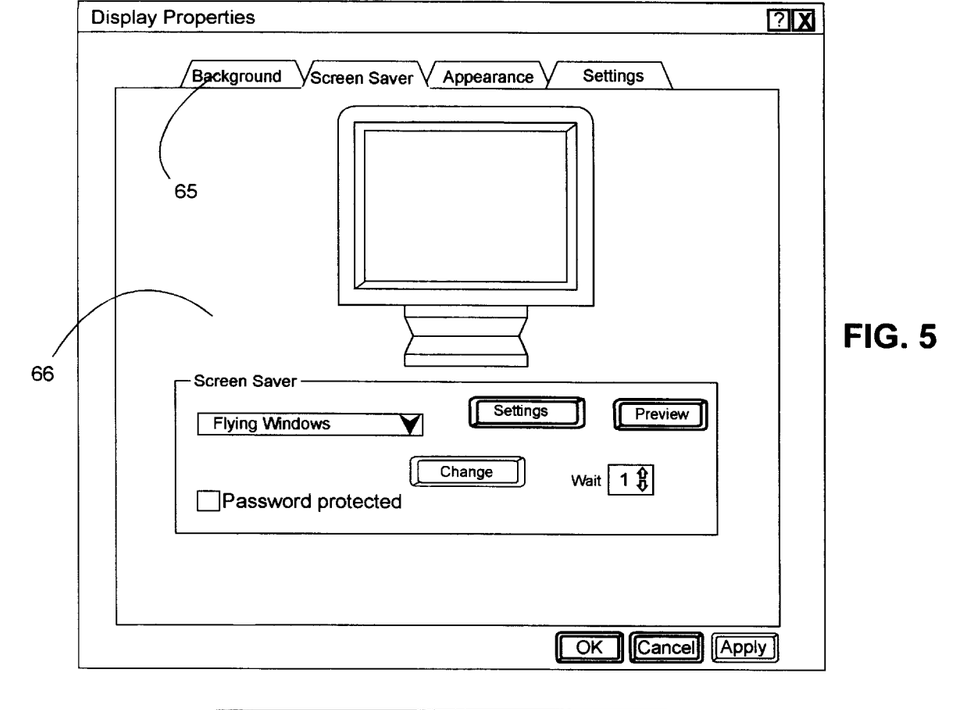
FIG. 5 is a diagrammatic view of an interactive dialog screen on one of the client computers prompting the user for customization of an operating system GUI at the display feature level.
Figure 6:
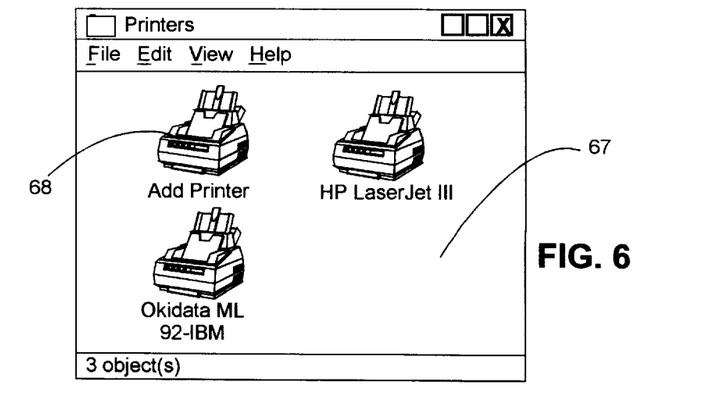
FIG. 6 is a diagrammatic view of a customized interactive display screen on one of the client computers for user selection of printers.

In our illustrative example, the interface of FIG. 3 is a typical dialog panel for the customization of the desktop themes involved in setting up the customized user desktop to an operating system, e.g. Windows '95. The user is prompted to customize up to several levels of windows 60. During such customization, he is prompted to select colors, patterns, icons, text, etc., for the several levels. FIG. 4 is a breakout of a section of a resulting desktop 61 with a customized selected number and arrangement of icons. FIG. 5 is another windows prompt screen for customization where various display properties may be brought up by selecting tabs 65 which brings up the appropriate screen panel 66 for selectively customizing the particular property. FIG. 6 is another example of a prompt screen 67 customized to show the printers accessible to the particular user. As a simple illustrative example relative to FIG. 6, let us assume that the initial GUI panel 67 did not contain "Add Printer" 68, and that the user customizes the interface in a manner standard to the windows operating system of which panel 67 is a part. The initial interface of panel 67 has been stored, let us say in storage hard drive 59 of server 50, FIG. 1. The system of the present invention tracks and determines the differences between the customized final panel 67, FIG. 6, and the initial printer panel, i.e. the image of the printer and text 68. This additional image 68 may be separately stored in the hard drive 59 of server 50 as an image overlay or template. Then, when the user subsequently brings up panel 67, the system of the present invention will combine these two separately stored images to provide the GUI panel shown in FIG. 6. Thus, if we assume that the network will have several users, each of whom wishes to customize the initial GUI panel differently, we do not have to store each customized panel as a separate complete panel. Rather, all we need to do is store the initial panel once and then just store the customized additions for each user panel. The system will then combine the same initial stored panel with the stored differences determined for each customized panel to display the customized panel. While the present illustration has been simplified so that the difference is only a single icon with text, it will be understood that the difference could have been very extensive and involve a considerable amount of graphics and images. In the latter cases, the saving of storage capacity would be quite substantial.

Figure 7:
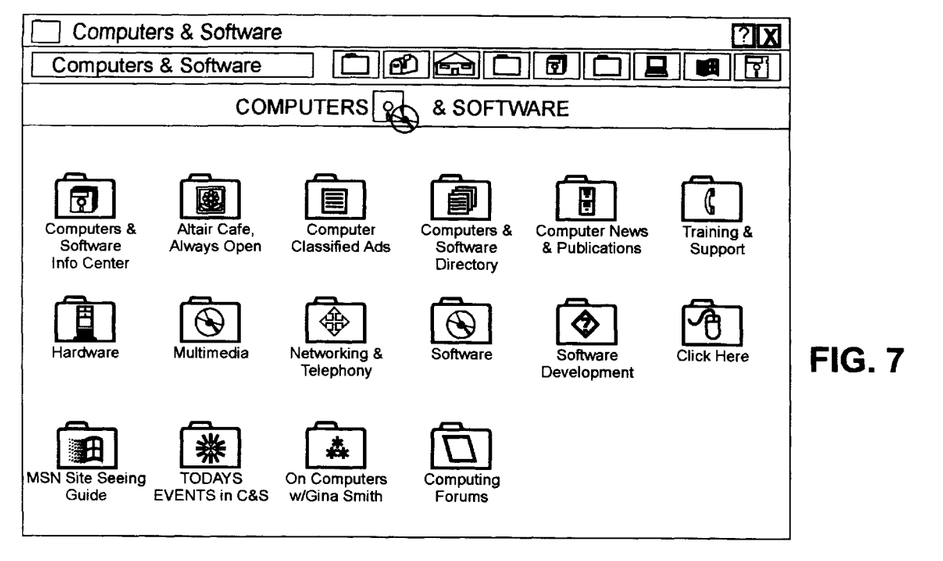
FIG. 7 is a diagrammatic view of an interactive screen on one of the client computers customized to include a set of icons, each for opening particular application programs represented by such icons.
Figure 8:
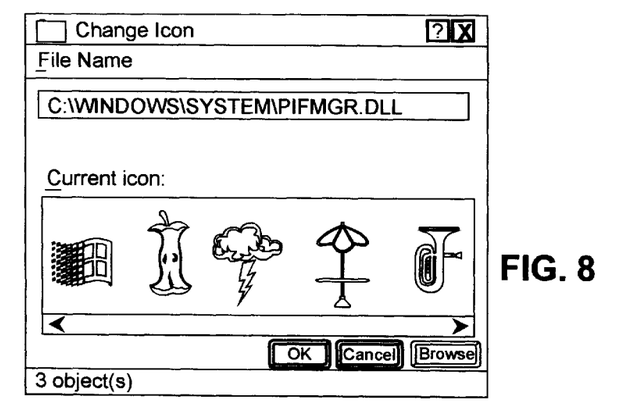
FIG. 8 is a diagrammatic view of an interactive display panel which a user of a client may use in changing icons in customizing his operating system or application programs.

While we have used the customization of GUIs in operating system interfaces in the above examples, the present invention is equally applicable to GUIs to the variety of application programs stored in the server and available to users through the client computers. FIG. 7 is a diagrammatic view of an interactive screen on one of the client computers customized to include a set of icons, each for opening particular application programs represented by such icons, and FIG. 8 is a diagrammatic view of an interactive display panel which a user of a client may use in changing icons in customizing his operating system or application programs.

Figure 9:
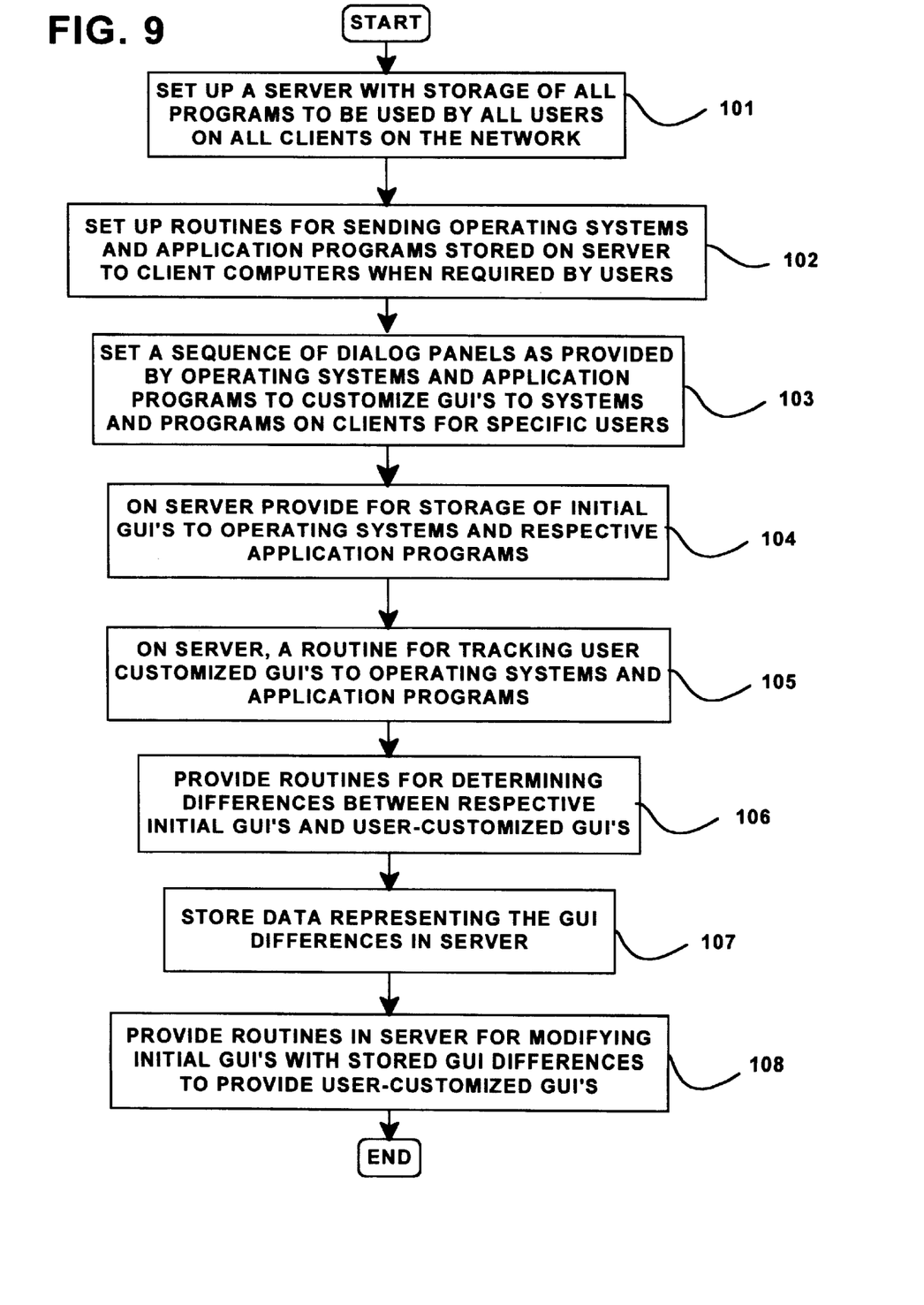
FIG. 9 is a flicker of the basic elements of the program in the server computer which enables the server to control the storage and display of customized GUIs in accordance with the present invention.

Now, with respect to FIG. 9, there will be generally described the basic elements of the program in the server computer which enables the server to control the operations illustrated with respect to FIGS. 3 through 8 for customizing GUIs to operating systems onto application programs on the client computers. The server 50, FIG. 1, is set up to store all programs and operating systems to be used by a variety of users on the client computers in the network, step 101. Then, step 102, routines are set up in the server for providing operating systems and application programs to users as required on client computers. Then, through a sequence of dialog panels provided to users logged onto client computers, the users are prompted to customize the GUIs to the respective operating systems and applications, step 103. The dialog panels provided to the users for customization of GUIs may be the standard customization options offered by the programs. The system on the server provides for the storage, step 104, of the initial GUIs provided to the users prior to the current customization step. As stated above, these initial interfaces may be GUIs initially set up with group features on the server over which the user may customize his own features. Then, step 105, there is provided on the server, a routine for tracking the user customization. Routines in the server are provided for determining the differences between the user customizations and the initial GUIs, step 106. These determined differences in the GUIs are stored in the server as data representative of the change, separate and apart from the stored representation of the initial GUIs, step 107. Then, at some subsequent computer operations point when the user calls for a particular customized GUI, routines are provided in the server for modifying the initial stored GUIs with the stored data representative of the customization changes to provide the user customized GUI displays, step 108.

Figure 10:
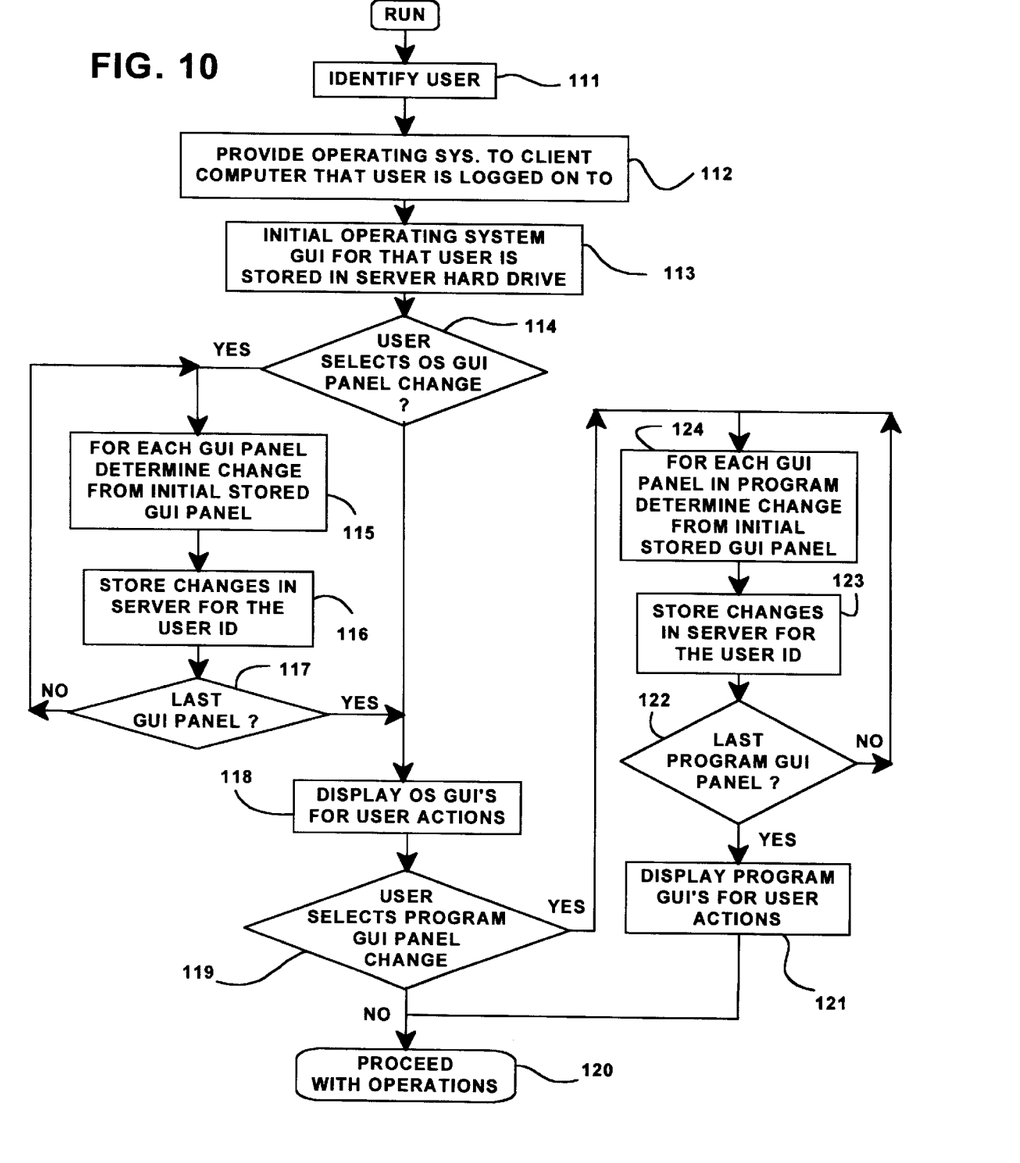
FIG. 10 is a flicker of a simplified run illustrating how the GUIs are customized and stored in accordance with the program of FIG. 9.

Now with respect to the flowchart of FIG. 10, we will run through a simple illustrative flowchart of typical steps which the user goes through in the customization of some operating system GUIs and some application program GUIs. When the user logs onto a client computer, the system identifies him, step 111. Then, the user is provided with the operating system allocated to him by the server, step 112, and the initial GUI for that operating system and that user is stored in the server hard disk drive, step 113. The operating system provides the user with customization options in the form of prompt panels typified by those shown in FIGS. 3 through 6. In decision step 114, the user decides whether he wishes to customize and screen panels in the initial interface. If No, then the flow goes to step 118 where the user interacts with the unmodified operating system interface. If the decision from step 114 is Yes, then, step 115, for each GUI screen panel which is changed by the user in customization, the data representative of the change is determined and these changes are stored as a separate entity in the server in connection with the users ID, step 116. When the last GUI panel to be changed is reached, Yes, in decision step 117, the flow moves on to step 118 where the user interacts with the interfaces in the routine computer operations. If the decision from step 117 is No, the flow returns to step 115 and the customization continues until the last GUI panel to be customized is completed. During the course of normal computer operations, the user will call for user application programs; the user may wish to customize screen panels in his GUI to such programs. If he does, as indicated as a Yes decision in step 119, then the process goes to step 124 and for each GUI screen panel which is changed by the user in customization, the data representative of the change is determined and these changes are stored as a separate entity in the server in connection with the user's ID, step 123. When the last GUI panel to be changed is reached, Yes, in decision step 122, the flow moves onto step 121 where the user interacts with the application program interfaces in the routine computer operations. If the decision from step 122 is No, the flow returns to step 124, and the customization continues until the last GUI panel to be customized is completed. It should be noted that if the user had decided not to customize any GUI panel, No in step 119, then the user would proceed with the application program in normal computer operations, step 120.

Figure 11:
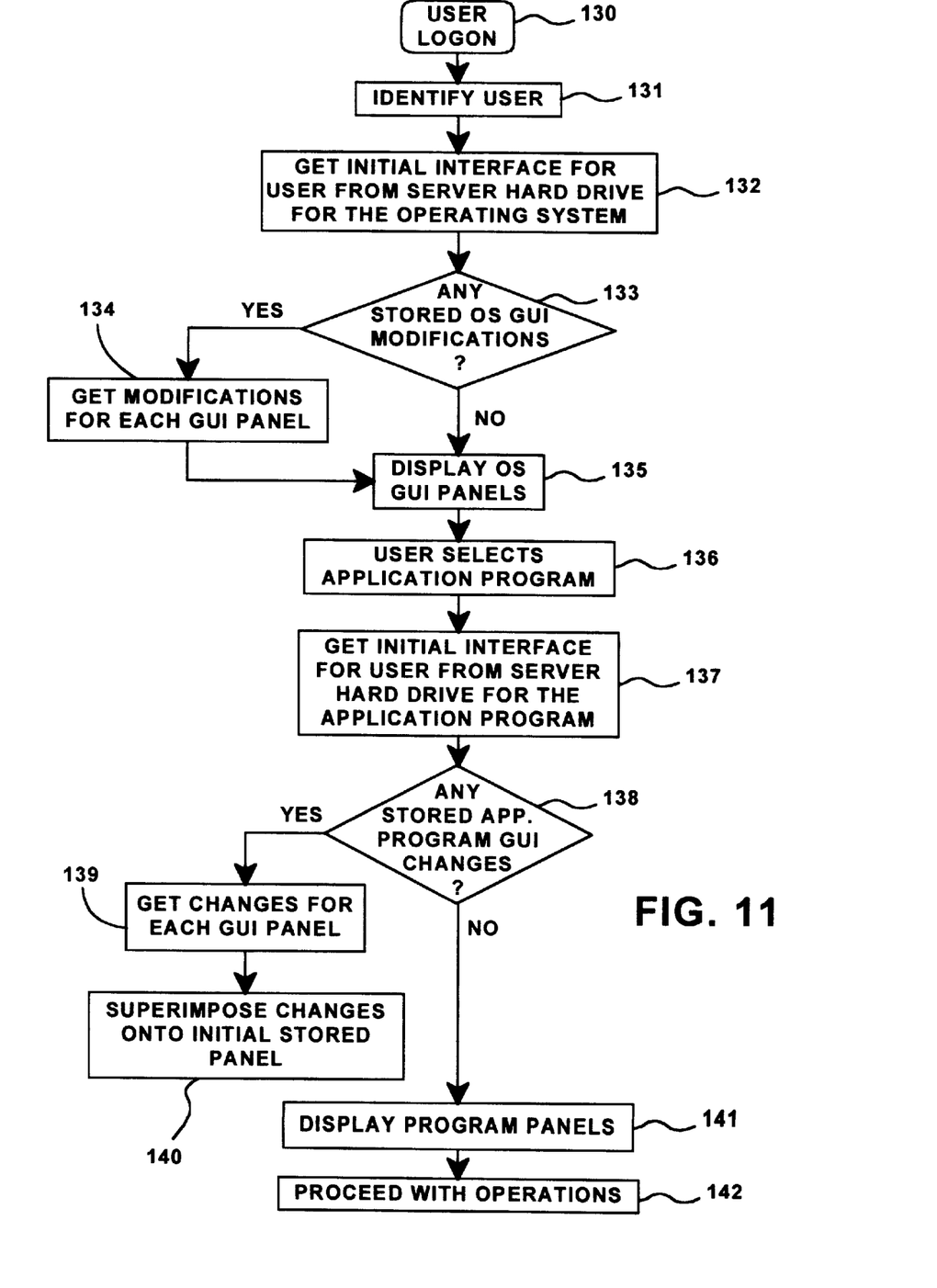
FIG. 11 is a flowchart of a simplified run to illustrate how the GUIs created by running the program of FIG. 10 may be displayed when needed by users.

Now, with reference to FIG. 11, we will describe how the system of the invention would typically reconstitute customized screen panels in GUIs to operating systems or to application programs. When the user logs on at a client computer 130 and is identified, step 131, the interface of screen panels for the operating system allocated to the user will be brought up by getting the initial or basic interface for each panel from its storage site on the server hard disk drive, step 132. A determination is made in decision step 133 as to whether the screen panel has been customized by user modifications. If Yes, then the data representative of the customizing modifications, which is separately stored in the disk drive, will be pointed to and gotten, step 134, and the modifications combined with the initial panel to provide the customized screen panel which is displayed, step 135. If there has been no customization of the screen panel, then a No decision from decision step 133 results in the initial uncustomized panel being displayed in step 135 and the user interactive operation proceeds in a customary manner.

During the interactive operation, assume that the user selects one of the application programs allocated to the user, step 136. The interface of screen panels for the particular application program allocated to the user will be brought up by getting the initial or basic interface for each panel from its storage site on the server hard disk drive, step 137. A determination is made in decision step 138 as to whether the screen panel has been customized by user modifications. If Yes, then the data representative of the customizing modifications, which is separately stored in the disk drive, will be pointed to and gotten, step 139, and the modifications superimposed upon the initial panel, step 140, to provide the customized screen panel which is displayed, step 141. If there has been no customization of the screen panel, then a No decision from decision step 138 results in the initial uncustomized panel being displayed in step 141 and the user interactive operation proceeds in a customary manner 142.

One described and claimed implementation of the present invention is as an application program made up of programming steps or instructions. Such a program 40 would be resident in RAM 14 of the server, FIG. 2, during computer operations. Until required by the computer system, the program instructions may be stored in another readable medium, e.g. in disk drive 20, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a local area network (LAN) or a wide area network (WAN), such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a network of client computers controlled by a server computer storing all application and operating system programs used in the client computers, a system for storing data representative of customized client computer graphical user interfaces comprising:

means for using said stored programs to create an initial graphical user interface to be used in said client computers, means for storing data representative of said initial graphical user interface, user interactive display means in at least one of said client computers for forming a subsequent graphical user interface by selective user customization of said initial graphical user interface, means for determining the differences between said subsequent user customized interface and said initial user interface, means for storing data representative of only the differences of said subsequent interface from said initial interface, and means for displaying said subsequent user interface by modifying the data representative of said initial interface with the data representative of said differences.

2. The network of claim 1 wherein said means for creating said initial user interface include said operating system and at least one of said application programs.

3. The network of claim 1 wherein all of said means for storing data are in said server computer.

4. The network of claim 3 wherein all of said means for storing data are in the hard disk drive of said server computer.

5. The network of claim 1 wherein said means for determining said differences and said means for modifying the data representative of said initial interface with said data representing said differences are in said server computer.

6. The network of claim 2 wherein said means for creating said initial graphical user interface include means for providing an initial customized interface by interactive user selection of customization options offered by said stored programs.

7. The network of claim 6 wherein said interactive user selection of said customization options is made through interactive display means in one of said client computers.

8. The network of claim 3 further including means in said server computer for identifying said subsequent customized graphical user interface with a specific user whereby said interface is presented to said user in response to a user logon to a client computer in said network.

9. The network of claim 3 further including means in said server computer for identifying said subsequent customized graphical user interface with a specific client computer whereby said interface is presented in response to a user logon to said client computer.

10. The network of claim 3 wherein said means for storing said data representative of the differences of said subsequent interface from said initial interface store said data in the form of an image template to be superimposed upon said initial graphical user interface to modify the images of said initial interface to display said subsequent customized user interface.

11. The network of claim 1 wherein said means for creating an initial graphical user interface include a graphical desktop environment, and said subsequent graphical user interface includes a customized desktop environment.

12. In a network of client computers controlled by a server computer storing all application and operating system programs used in the client computers, a method for storing data representative of customized client computer graphical user interfaces comprising:

using said stored programs to create an initial graphical user interface to be used in said client computers, storing data representative of said initial graphical user interface, interactively forming a subsequent graphical user interface by selective user customization of said initial graphical user interface through a client computer, determining the differences between said subsequent user customized interface and said initial user interface, storing data representative of only the differences of said subsequent interface from said initial interface, and displaying said subsequent user interface by modifying the data representative of said initial interface with the data representative of said differences.

13. The method of claim 12 wherein said programs used for creating said initial user interface include said operating system and at least one of said application programs.

14. The method of claim 12 wherein all of said stored data is stored in said server computer.

15. The method of claim 14 wherein all of said stored data is in the hard disk drive of said server computer.

16. The method of claim 15 wherein said steps of determining said differences and for modifying the data representative of said initial interface with said data representing said differences are carried out in said server computer.

17. The network of claim 13 wherein said step of creating said initial graphical user interface provides an initial customized interface by interactive user selection of customization options offered by said stored programs.

18. The method of claim 17 wherein said interactive user selection of said customization options is interactively made through one of said client computers.

19. The method of claim 14 further including the step in said server computer of identifying said subsequent customized graphical user interface with a specific user whereby said interface is presented to said user in response to a user logon to a client computer in said network.

20. The method of claim 14 further including the step in said server computer of identifying said subsequent customized graphical user interface with a specific client computer whereby said interface is presented in response to a user logon to said client computer.

21. The method of claim 14 wherein said step of storing said data representative of the differences of said subsequent interface from said initial interface stores said data in the form of an image template to be superimposed upon initial graphical user interface to modify the images of said initial interface to display said subsequent customized user interface.

22. The method of claim 12 wherein said step of creating an initial graphical user interface is carried out in a graphical desktop environment, and said subsequent graphical user interface includes a customized desktop environment.

23. A computer program having program code included on a computer readable medium for storing data representative of customized client computer graphical user interfaces in a network of client computers controlled by a server computer storing all application and operating system programs used in the client computers comprising:

means for using said stored programs to create an initial graphical user interface to be used in said client computers, means for storing data representative of said initial graphical user interface, user interactive display means in at least one of said client computers for forming a subsequent graphical user interface by selective user customization of said initial graphical user interface, means for determining the differences between said subsequent user customized interface and said initial user interface, means for storing data representative of only the differences of said subsequent interface from said initial interface, and means for displaying said subsequent user interface by modifying the data representative of said initial interface with the data representative of said differences.

24. The computer program of claim 23 wherein said means for creating said initial user interface includes said operating system and at least one of said application programs.

25. The computer program of claim 23 wherein all of said means for storing data are in said server computer.

26. The computer program of claim 25 wherein all of said means for storing data are in the hard disk drive of said server computer.

27. The computer program of claim 23 wherein said means for determining said differences and said means for modifying the data representative of said initial interface with said data representing said differences are in said server computer.

28. The computer program of claim 24 wherein said means for creating said initial graphical user interface include means for providing an initial customized interface by interactive user selection of customization options offered by said stored programs.

29. The computer program of claim 28 wherein said interactive user selection of said customization options is made through interactive display means in one of said client computers.

30. The computer program of claim 25 further including means in said server computer for identifying said subsequent customized graphical user interface with a specific user whereby said interface is presented to said user in response to a user logon to a client computer in said network.

31. The computer program of claim 25 further including means in said server computer for identifying said subsequent customized graphical user interface with a specific client computer whereby said interface is presented in response to a user logon to said client computer.

32. The computer program of claim 25 wherein said means for storing said data representative of the differences of said subsequent interface from said initial interface store said data in the form of an image template to be superimposed upon initial graphical user interface to modify the images of said initial interface to display said subsequent customized user interface.

33. The computer program of claim 23 wherein said means for creating an initial graphical user interface include a graphical desktop environment, and said subsequent graphical user interface includes a customized desktop environment.

\* \* \* \* \*